Patented Jan. 23, 1940

2,187,734

UNITED STATES PATENT OFFICE 2,187,734

WAX COVERING FOR FOOD PRODUCTS

Edward C. Ennis, Chicago, Ill.

No Drawing. Application February 25, 1938,
Serial No. 192,580

8 Claims. (Cl. 99—166)

This invention relates to new and improved method and materials adapted for covering and preserving food products, and which are particularly adapted for use as a covering or coating for cheese, although the method and materials may be adapted for use on other food products, as for example, meat loaves, sausages, hams, etc.

At the present time food products, and especially cheese in the form of bricks, blocks or loaves, in various states of hydration or moisture content are coated with paraffine. Ordinarily paraffine is crystalline and upon drying and standing when coated on cheese, enters into a considerable portion of its outer thickness, dries, becomes crystalline, cracks and becomes powdery, so that an imperfect coating is obtained which has little or no flexibility or tensile strength, cracks, peels and chips off in storage or handling due to the crystalline structure, exposes the contents of the materials which have been covered so that they are exposed to the action of the air and suffer by reason of contamination and dehydration, and in general are wasteful of the product which is desired to be preserved and is often times ineffectual for such purpose and even detrimental thereto. Further, the use of such coatings is not adaptable for use on small quantities of food products such as on small cakes of cheese, in that the percentage of waste rises to too great an extent, and also in that the coating of paraffine is too difficult to be separated economically and does not readily part. Wrappings of foils or cellulosic materials have recognized inherent defects and are not suitable for use in long storage or excessive handling.

This inherent defect or unsuitability of paraffine as a coating material has heretofore been recognized and attempts have been made to essentially retain the use of paraffine while modifying its characteristics by compounding therewith oils, waxes, petrolatums, resins or other such materials in minor quantities to give greater elasticity or flexibility to the paraffine. However, these materials have been but slight departures from the use of paraffine alone and upon standing, aging or handling, the defects of using essentially a paraffine wax have remained and which has not been cured by plural or repeated coatings of the same material.

It is an object of this invention to provide a flexible, impervious, adherent coating for food products, and one especially adapted for coating cheese, which may be subjected to long or short periods of storage with equal efficacy, is highly adapted to withstand handling and usage during storage, transportation, and sale, and which can be applied to large or small articles or to segments of cheese of varying sizes with equal facility, and to truly protect and preserve it.

Another object is to provide a waxy covering for food products so formed that it varies in physical characteristics in substantially a progressive manner from the interior or food contacting applied surface to the outer side of its thickness.

Another object is to provide a wax coating for food products particularly adapted to be used as a coating for cheese which comprises a food contacting layer which is free from or substantially free from crystallization characteristics and has a relatively high penetrating power.

Another object relates to the method of incorporating coloring material in a wax coating for food products which is separated from the food product by an intermediate layer of wax of differing physical characteristics.

A further object relates to the method of applying a wax covering or coating to food products, and particularly to cheese, by successive steps of petroleum waxy material of differing characteristics and blending the same together, but preserving the essential characteristics of each layer in their respective innermost or outermost surfaces.

Other objects relate to various economies of materials, their application, their composition, their suitability for the products herein contemplated, their ability to be readily adhered to or separated from the food products upon proper occasion, and various other objects and advantages which will be apparent from a consideration of the following specification:

I have found that while the use of an exterior coating of paraffine for food products such as cheese is desirable, it has the inherent defects as hereinbefore stated and which are not overcome even though having incorporated therewith minor proportions of higher melting point petroleum waxes, petrolatum, or resins. Since it is desirable that the coating or covering for cheese be essentially non-crystalline and have a high penetrating power, I have found that amorphous petroleum wax is eminently suited to meet these requirements. However, such amorphous petroleum wax is more or less sticky or tacky and while having excellent preserving qualities it is not suitable for handling. I therefore found that if for example, a cheese, is first coated with a layer of essentially amorphous petroleum wax and later covered with a coating of essentially paraffine wax, a compound coating is obtained which has a desirable substantially non-crystalline interior structure and has an outer layer of non-tacky paraffine, to form an integral coating of great toughness and flexibility. By the application of these two coatings in successive steps there is formed an intermediate blending or joining of the two coatings so that there is in effect a coating having three zones extending through its thickness, the interior surface which contacts the food being essentially of amorphous petroleum wax, the outer exposed surface being essentially paraffine wax and an amalgamated or blended zone between the two, so that the physical characteristics of the built up coating progressively varies in the direction of its thickness.

It will thus be seen that by reason of the use of this compound coating it may be readily separated from the material to which it is applied by breaking or cutting the coating and peeling the entire coating therefrom, as the interior surface remains soft and readily separable by reason of its being joined to the firm exteriorly lying material. Also it will be seen that by reason of the application of the coating in successive separate layers of essentially different materials, coloring matter may be readily incorporated in the second or exterior layer of coating material which is held separated from the food product by reason of the interior coating layer, so that the food product is not contaminated nor affected by the coloring in the exterior layer and thus there may be adapted to the exterior color coatings of coloring materials which at the present time are not accepted as suitable or adaptable for coloring food products or for use in ordinary single layer wax coatings.

The general source of materials whose use is herein contemplated is from a paraffinic base oil and are derived from the wax distillate and the steam refined cylinder stock fractions. The paraffine wax is obtained from the wax distillate portion by chilling to low temperatures and pumping through filter process to strain the solidified wax from the oil. This solidified wax is then subjected to further treatment such as "sweating" to relieve it of entrained oil and filtered through fuller's earth for clarification and whitening to produce a highly crystalline and porous paraffine wax. This paraffine wax may be entirely or substantially entirely relieved of its entrained oil to result in a commercial paraffine. When small amounts of oil are left entrained in the wax the material is termed "scale wax" and is somewhat less brittle than the highly refined paraffine. It is therefore to be understood that as used in the specification and claims the term "paraffine wax" may include the highly refined paraffine and so-called "scale waxes" if low in oil content and the "scale wax" may replace all or part of the paraffine in the compounds hereinafter set forth.

The steam refined cylinder stock fraction of the crude oil is the source of petrolatum and the amorphous petroleum wax herein contemplated, which cannot be separated by the use of the filter press for the reason that these sought for products are substantially amorphous, and any crystalline formation is of sub-microscopic size. Therefore to refine this fraction of the oil the material is mixed with light naphtha and gasoline and filtered to the desired color. This mixture is then chilled to sub-zero temperatures and separated by running through a suitable device such as Sharples centrifuge which separates the solidified jelly-like material from the oil, this jelly-like material being generally termed "petrolatum". This petrolatum is then subjected to re-centrifuging and the amorphous petroleum wax is thereby separated from the petrolatum after which it may be filtered through fuller's earth to any desired color, the low melting point material being known as "petrolatum" and the high melting point material being known as "amorphous wax."

The following is a comparative analysis of average commercial specimens of paraffin wax, amorphous wax and petrolatum which clearly sets forth the contrasting physical characteristics of the materials:

|  | Paraffine wax | Amorphous wax | Petrolatum |
|---|---|---|---|
| Penetration at— | | | |
| 32° F., 200 grams, 60 seconds | 10 | 27 | Too soft. |
| 77° F., 100 grams, 5 seconds | 16 | 42 | Do. |
| 90° F., 50 grams, 5 seconds | 16 | 40 | Do. |
| Ductility at 80° F. centimeter | 0 | 2 | Do. |
| Melting point °F. | 128.2 | 140.8 | 128.8 |

It is of course to be understood that the penetration of paraffine wax may range from 10 to 25 and that of amorphous wax from 25 to 50. It will also be understood that the melting point of paraffine wax may vary from between 120° to 138° F. and that of the amorphous wax may range from 130° to 160° F.

Microscopic observation of these three materials dissolved in a solvent, a drop of which was placed on a slide and the solvent permitted to evaporate showed as follows:

Paraffin wax: Large clearly defined crystalline structure under low magnification.
Amorphous wax: Under equal magnification, no crystalline structure visible. Under high magnification very fine crystals visible.
Petrolatum: No crystalline structure visible either under low or high magnification.

It will therefore be understood that the term "amorphous petroleum wax" as used in the specification and claims herein refers to the material hereinabove described and which is substantially free from paraffine wax and substantially free from petrolatum. These amorphous waxes consist generally of the higher members of the paraffine series of hydrocarbons and probably some of the higher olefins. The color may vary from greenish yellow to almost white and in consistency is soft and flexible and more or less tacky. It carries less than 1% ash and volatilizes without any acrid odor, and is considerably less oily in nature than petrolatum.

In carrying out the coating operation, a suitable combination for the first coat may be 40 parts of paraffine wax having a melting point between 120 and 138° F. and 60 parts amorphous petroleum wax having a melting point of 130 and 160° F. The cheese or other food product may then be dipped or coated in any suitable manner or by conventional means in a melted mixture of these waxes to yield a soft more or less sticky or tacky waxy covering. After this initial coating has cooled it is re-dipped in a second and different wax compound mixture which has preferably a slightly lower melting point. This second mixture may suitably comprise 20 to 30 parts of amorphous petroleum wax of the kind hereinabove set forth and 70 to 80 parts of paraffine wax of the kind also hereinabove set forth.

The first coating cools in a very few minutes after which it is dipped in the above set forth second wax mixture, the second mixture being kept preferably at about 5 to 10° above its melting point so as to prevent the first applied coating from liquefying and to only partially fuse therewith. This second wax coating may contain suitable coloring material, and completely coats and bonds with the first layer to give a firm and non-tacky exterior coating thereto. It will thus be seen that by using wax compositions each of which are predominantly differing in physical characteristics and regulating the temperature and method of application a firmly integrated unitary coating is obtained which varies in tackiness, penetration and crystalline structure from the interior food contacting surface to the exterior exposed surface, and is essentially comprised of three zones.

It will also be understood that while I have above set forth a suitable method, and waxy coating layers of suitable composition, the composition of these layers may vary in accordance with the material to be covered or with the use to which it is to be adapted. It is comprehended within the scope of this invention that the interior or first wax coating may comprise more than 50% and up to 100% of amorphous petroleum wax, and that the exterior or outer wax coating may comprise more than 50% and up to 100% of paraffine wax. It will thus be understood that it is comprehended within the scope of this invention that modifications may be made in the materials and their component percentages without departing from the spirit of my inventions except as limited by the following claims.

I claim as my invention:

1. The method of applying a protective and preservative coating to cheese, sausage, meat loaves, ham and the like food products which comprises applying a primary molten waxy coating thereover comprising essentially a tacky, ductile, amorphous petroleum wax, cooling the said coating, and thereafter applying a secondary molten coating comprising essentially a non-tacky, substantially crystalline paraffine wax.

2. The method of applying a protective and preservative coating to cheese in separate blended layers, embodying non-cheese-contacting coloring matter, which comprises applying a primary molten coating comprising essentially amorphous petroleum wax, allowing the said coating to cool, and thereafter applying a secondary coating comprising essentially paraffine and coloring matter, at approximately 5–10° F. above its melting point.

3. The method of applying a protective and preservative coating to cheese which comprises applying a primary molten waxy mixture thereto comprising substantially in excess of 50% of amorphous petroleum wax having a melting point of approximately 130–160° F., allowing said coating to cool, and applying thereto a secondary coating comprising substantially in excess of 50% of paraffine wax having a melting point of approximately 120–138° F. the said secondary coating being applied at a temperature of approximately 5–10° F. above its melting point.

4. The method of applying a protective and preservative covering to cheese which comprises dipping the cheese in a molten waxy mixture comprising approximately 60% amorphous petroleum wax having a melting point of 130–160° F. and approximately 40% of paraffine wax having a melting point of 120–138° F., withdrawing the cheese from said mixture and allowing the waxy coating thereon to cool and harden, and then re-dipping the coated cheese in a secondary coating mixture comprising approximately 20–30% of said amorphous petroleum wax and approximately 70–80% of said paraffine wax, the dipping temperature of said secondary cooling mixture being 5–10° above its melting point.

5. The combination with a solid food product of a removable, flexible, moisture resistant, stable protective coating comprising, a ductile and tacky inner layer in intimate contact with said product consisting essentially of amorphous petroleum wax, a relatively firm and non-tacky outer layer consisting essentially of paraffin wax and an intermediate portion in which said layers are blended together, said coating being sufficiently flexible and thick and said inner layer being sufficiently ductile and tacky that said coating can be peeled from said product.

6. The combination with a solid food product of a removable, flexible, moisture resistant stable protective coating comprising, a ductile and tacky wax inner layer containing substantially in excess of 50% of amorphous petroleum wax having a melting point between 130 and 160° F., a relatively firm and non-tacky wax outer layer containing substantially in excess of 50% of paraffin wax having a melting point between 120 and 138° F., and an intermediate portion in which said layers are blended together, said coating being sufficiently flexible and thick and said inner layer being sufficiently ductile and tacky that said coating can be peeled from said product.

7. The combination with a solid food product of a removable, flexible, moisture resistant stable protective coating comprising a ductile and tacky inner layer containing approximately 60 parts amorphous petroleum wax and 40 parts paraffin wax, a relatively firm and non-tacky outer layer containing approximately 70 to 80 parts of paraffin wax and 20 to 30 parts amorphous petroleum wax, and an intermediate portion in which said layers are blended together, said coating being sufficiently flexible and thick and said inner layer being sufficiently ductile and tacky that said coating can be peeled from said product.

8. The combination with cheese of a removable, flexible, moisture resistant, stable protective coating comprising, a ductile and tacky inner layer containing amorphous petroleum wax and paraffin wax and having at least 60 parts amorphous petroleum wax, a relatively firm non-tacky outer layer containing paraffin wax and amorphous petroleum wax and having at least 70 parts paraffin wax, and an intermediate portion in which said layers are blended together, said coating being sufficiently ductile and tacky that said coating can be peeled from said cheese.

EDWARD C. ENNIS.